United States Patent [19]
Boltz et al.

[11] Patent Number: 6,044,275
[45] Date of Patent: Mar. 28, 2000

[54] SYSTEM AND METHOD FOR TIME DEFINED DELIVERY OF SHORT MESSAGE SERVICE MESSAGES

[75] Inventors: David Boltz; David B. Westbrook, both of Garland, Tex.

[73] Assignee: Ericsson Inc., Research Triangle Park, N.C.

[21] Appl. No.: 09/046,149

[22] Filed: Mar. 23, 1998

[51] Int. Cl.[7] .................................................. H04Q 7/20
[52] U.S. Cl. ........................... 455/466; 455/412; 455/419
[58] Field of Search .................................... 455/466, 31.3, 455/31.2, 412, 413, 414, 418, 419, 458, 550, 514; 379/67.1, 88.23, 88.25

[56] References Cited

U.S. PATENT DOCUMENTS

| | | | |
|---|---|---|---|
| 5,787,151 | 7/1998 | Nakatsu et al. | 379/67.1 |
| 5,878,351 | 3/1999 | Alanara et al. | 455/466 |

FOREIGN PATENT DOCUMENTS

| | | |
|---|---|---|
| 0 693 860 A2 | 1/1996 | European Pat. Off. . |
| WO 95/12933 | 5/1995 | WIPO . |
| WO 96/20572 | 7/1996 | WIPO . |

OTHER PUBLICATIONS

Michael Hientz and Matthies Tillmann; Der Short Message Services—Ein Neuer Dienst Der Digitalen Mobilkommunikation; ITG–Fachberichte, No. 124, Sep. 1, 1993; pp. 517–526 (not translated).

PCT International Search Report dated Jul. 9, 1999.

*Primary Examiner*—Lee Nguyen
*Attorney, Agent, or Firm*—Jenkens & Gilchrist, P.C.

[57] ABSTRACT

A telecommunications system and method is disclosed for allowing a mobile subscriber to define a date and time of delivery for a Short Message Service (SMS) message sent by the mobile subscriber to another mobile subscriber. This can be accomplished by transporting the date and time delivery information to the SMS Service Center along with the SMS message, where it can be stored until the requested time of delivery. Once the requested time of delivery occurs, the SMS message can be forwarded to desired mobile subscriber. Alternatively, the SMS message can be stored in either the Mobile Switching Center or the mobile terminal itself until the specified date and time of delivery is reached. Advantageously, embodiments of the present invention both allow mobile subscribers the ability to send messages to themselves at predetermined times, and allow a supervisor to program the delivery of an SMS message to employees.

13 Claims, 5 Drawing Sheets

SYSTEM AND METHOD FOR TIME DEFINED DELIVERY OF SHORT MESSAGE SERVICE MESSAGES

BACKGROUND OF THE PRESENT INVENTION

1. Field of the Invention

The present invention relates generally to telecommunications systems and methods for delivering Short Message Service (SMS) messages from mobile terminal to mobile terminal, and specifically to allowing the originating mobile terminal to control the time and date of delivery of the SMS message.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system in use today, and described in more detail herein.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

With reference now to FIG. 2 of the drawings, text messages, containing up to 160 alpha numerical characters, can be sent to and from MSs 200, using current Short Message Service (SMS) 210 technology. SMS 210 utilizes a Service Center 220, which stores and forwards short messages to MSs 200. A SMS 210 message can be sent from the Service Center 220 to the MS 200 or from the MS 200 to the Service Center 220.

The mobile terminated SMS 210 transfers a short message from the Service Center 220 to the MS 200. In addition, information about the delivery of the short message is returned to the Service Center 220. This information is either a delivery report, which confirms the delivery of the message to a recipient, or a failure report, which informs the Service Center 220 that the short message was not delivered and the reason why. If the information is a failure report, the Service Center 220 has the ability to order retransmission later.

A mobile terminated SMS message typically originates by a user 240 sending a message to the Service Center 220, which then forwards the message to the SMS Gateway Mobile Switching Center (SMS-GMSC) 250. Thereafter, the SMS-GMSC 250 interrogates the HLR 260 for routing information pertaining to the designated MS 200. The HLR 260 returns this routing information to the SMS-GMSC 250, which can then route the message to the MSC/VLR 270 serving the location area (LA) 205 that the MS 200 is in. If the MS 200 is in IDLE mode (not in use), the MS 200 is paged, and a connection is set up between the MS 200 and the network 270, as in the normal call setup case. The MSC/VLR 270 then delivers the SMS message 210 to the MS 200. SMS messages 210 are preferably transmitted on the allocated signaling channel. However, if the MS 200 is in busy mode (in use), the SMS message 210 will be transmitted on the Slow Associated Control Channel (SACCH). In that case, no paging, call setup, or authentication need to be performed.

After the MSC/VLR 270 sends the SMS message 210 to the MS, a delivery report is sent from the serving MSC/VLR 270 to the Service Center 220. If delivery of the SMS message 210 was not successful, the HLR 260 is informed, and a failure report is sent to the Service Center 220. In addition, if the delivery was unsuccessful, a Messages Waiting service 215 within the Service Center 210 can optionally provide the HLR 260 and the serving MSC/VLR 270 with the information that there is a message in the originating Service Center 220 waiting to be delivered to the MS 200. Once the MS 200 becomes available for receipt of the SMS message 210, the HLR 260 informs the Service Center 220 and the SMS message 210 is sent again. The mobile terminated SMS message 210 can be input to the Service Center 220 by a variety of sources, e.g., speech, telex or facsimile.

A mobile originated SMS message can also be submitted by the MS 200 to the Service Center 220. The MS 200 first establishes a connection to the network (serving MSC/VLR 270), as in the case of a normal call setup. However, it should be noted that if the MS is in busy mode, a connection already exists. Once a connection is made with the serving MSC/VLR 270 and the authentication of MS 200 is confirmed, the MS 200 can send the SMS message to the Service Center 220 via the serving MSC/VLR 270 and the serving BTS 230. The Service Center 220 in turn forwards the SMS message 210 to its destination, which could be another MS (not shown), the originating MS 200 (in the case of a reminder message), or a user 240 in the fixed network, the latter of which is illustrated in FIG. 2. Once the SMS message 210 is delivered to the end user 240, either a delivery report or a failure report is sent to the Service Center 220.

Today, a mobile subscriber is allowed to send a Point to Point SMS message 210 to another mobile subscriber. However, the SMS message 210 is typically delivered as soon as possible, without regards to when the originator would like it to be delivered. Thus, the originator of the message has no control over when the SMS message 210 is delivered.

It is, therefore, an object of the present invention to enable a mobile subscriber to control the time of delivery of a Short Message Service message sent by the mobile subscriber to another mobile subscriber.

SUMMARY OF THE INVENTION

The present invention is directed to telecommunications systems and methods for allowing a mobile subscriber to define a date and time of delivery for a Short Message Service (SMS) message sent by the mobile subscriber to another mobile subscriber. This can be accomplished by transporting the date and time delivery information to the SMS Service Center along with the SMS message, where it can be stored until the requested time of delivery. Once the requested time of delivery occurs, the SMS message can be forwarded to desired mobile subscriber. Alternatively, the SMS message can be stored in the Mobile Switching Center or the mobile terminal itself until the specified date and time of delivery is reached. Advantageously, embodiments of the present invention give mobile subscribers the ability to send messages to themselves at predetermined times. In addition, embodiments of the present invention would allow a supervisor to program the delivery of an SMS message to remind employees of important events, such as meetings.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
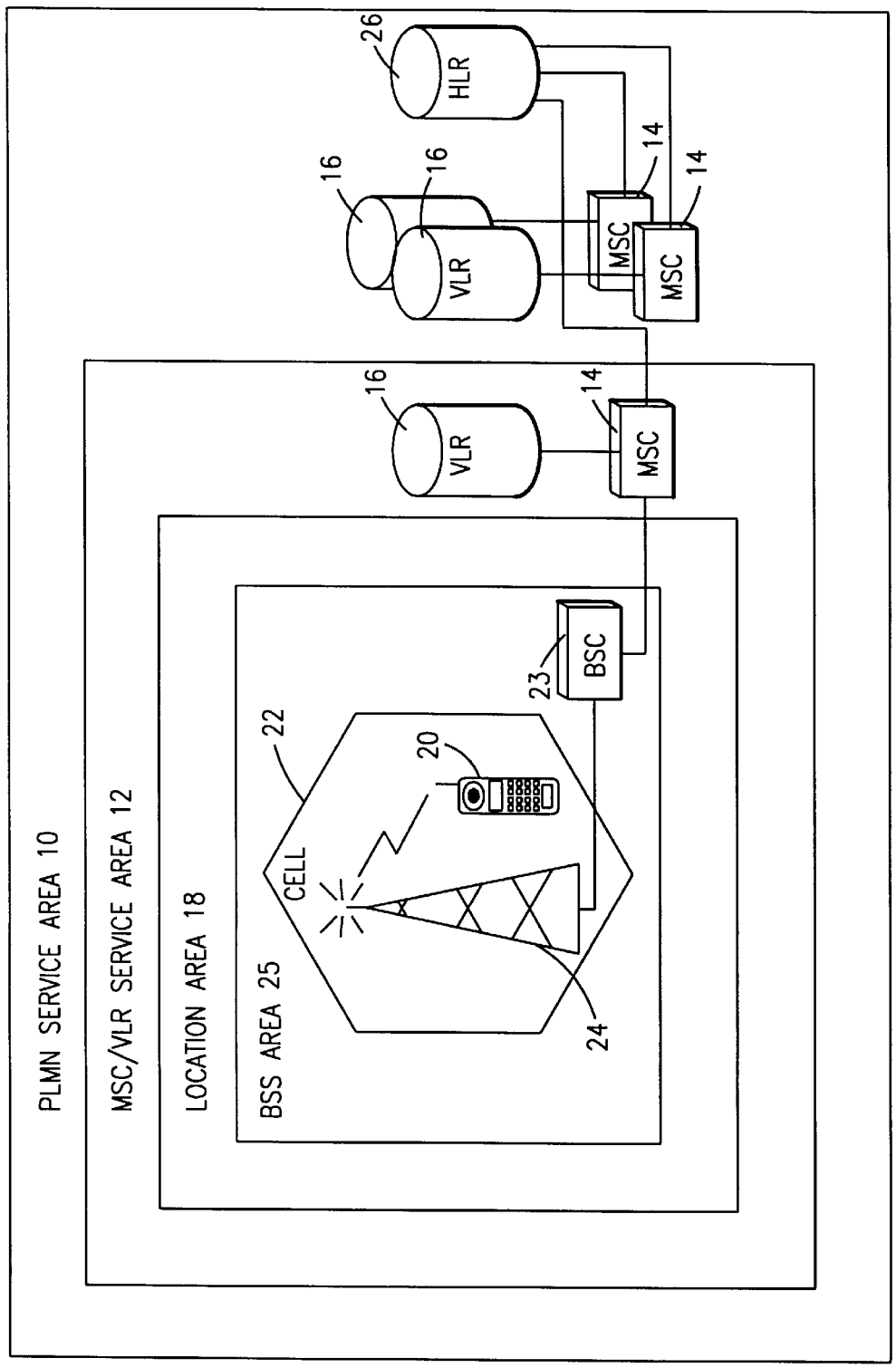
FIG. 1 is a block diagram of a conventional terrestrially-based wireless telecommunications system.
Figure 2:
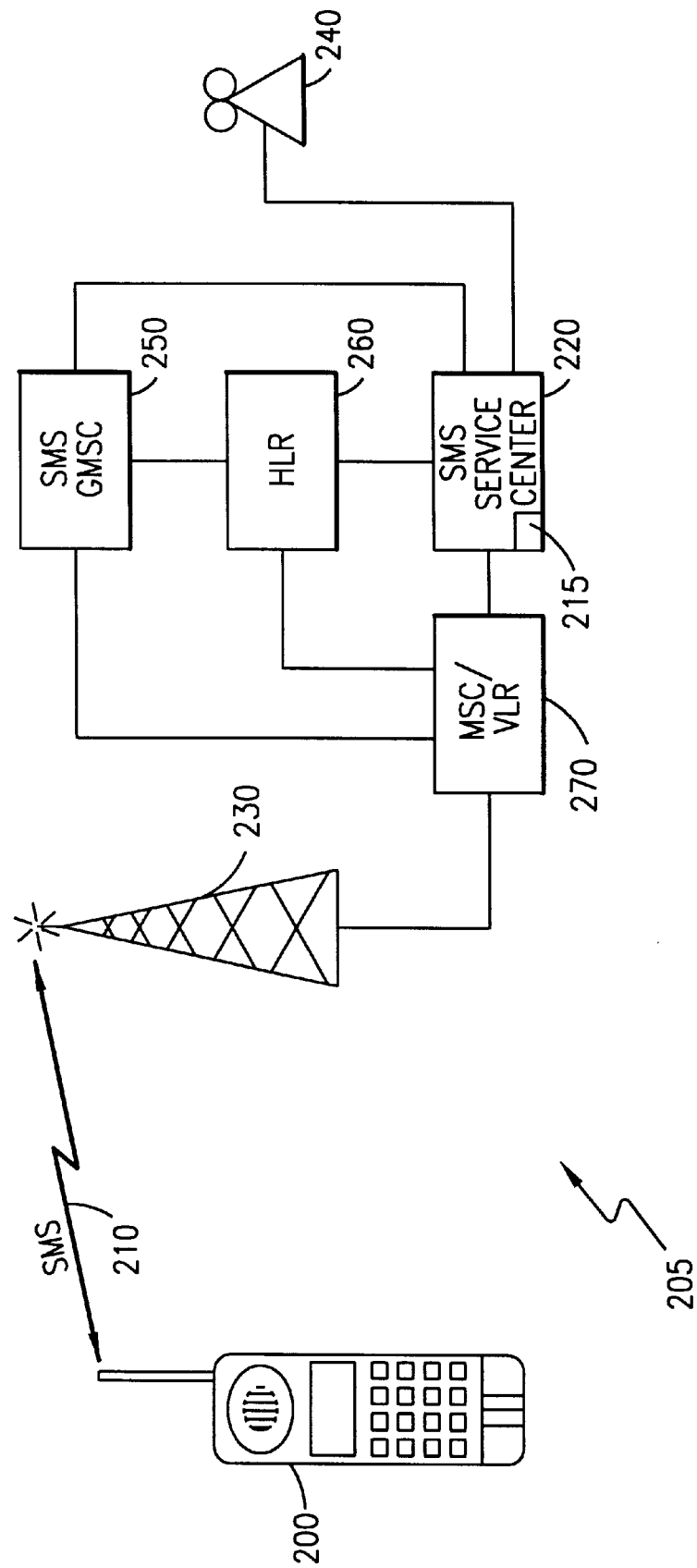
FIG. 2 illustrates the delivery of Short Message Service (SMS) messages to and from a mobile terminal.
Figure 3:
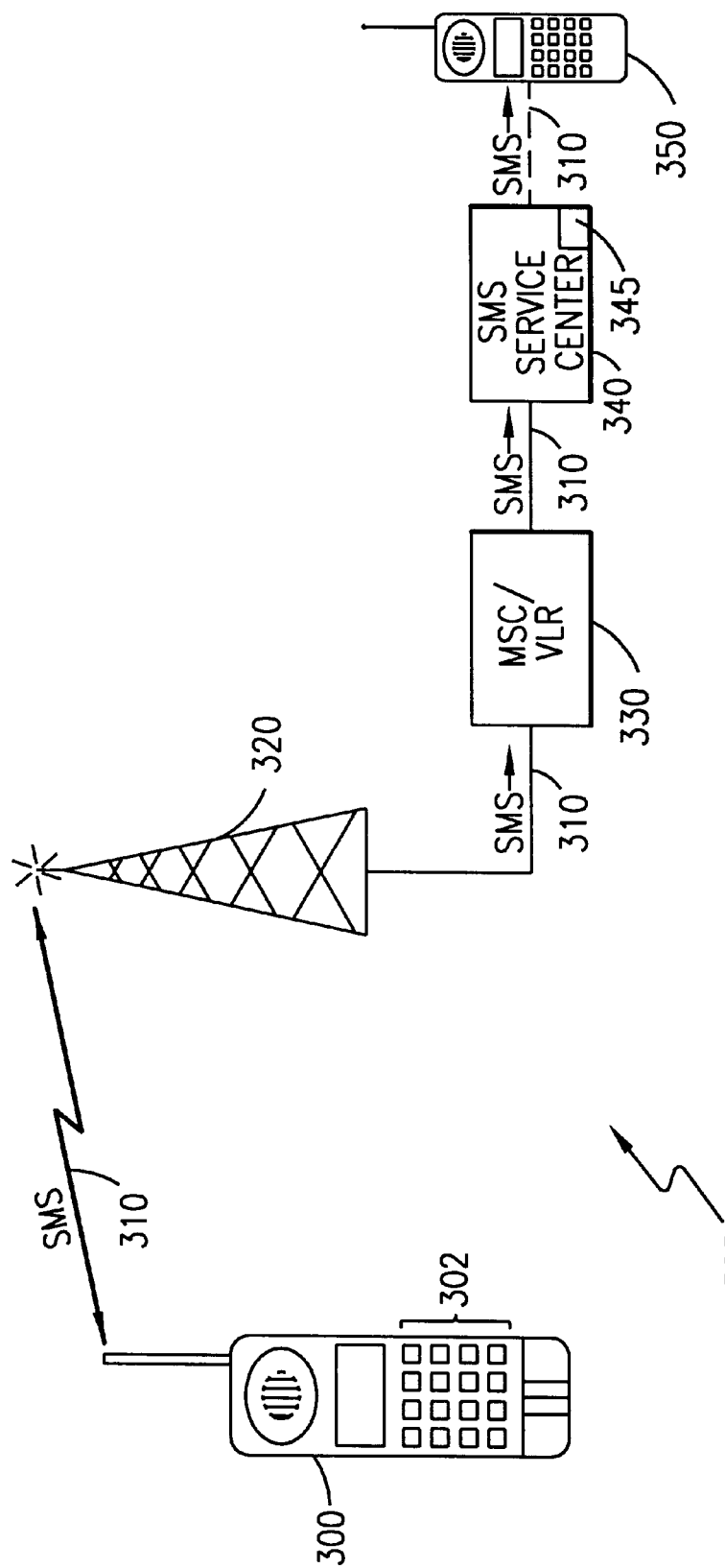
FIG. 3 shows the storage of an SMS message within an SMS Service Center until the requested time and date of delivery is reached.

With reference now to FIG. 3 of the drawings, an originator of a Short Message Service (SMS) message 310 can define the date and time for delivery of the SMS message 310 when the SMS message 310 is created. In a first embodiment of the present invention, if the SMS originator is a mobile subscriber, the mobile subscriber first establishes a connection between a Mobile Station 300 assigned to the mobile subscriber and a MSC/VLR 330 serving the location area 305 that the MS 300 is in, as in the case of a normal call setup. However, it should be noted that if the MS 300 is in busy mode, a connection already exists.

Once a connection is made with the serving MSC/VLR 330 and the authentication of MS 300 is confirmed, the mobile subscriber can enter a service code, e.g., *99, on a keypad 302 of the MS 300 followed by the time and date of delivery desired. Thereafter, the mobile subscriber can enter the SMS message 310 which is to be sent at the defined date and time. The MS 300 then sends the SMS message 310 along with the time and date information to a SMS Service Center 340 via the serving MSC/VLR 330 and a serving Base Transceiver Station (BTS) 320. The SMS Service Center 340 stores the SMS message 310 in a memory 345 until the requested time of delivery, at which time the SMS message 310 is forwarded to the desired end party, e.g., another MS 350. Once the SMS message 310 is delivered to the end party 350, either a delivery report or a failure report is sent to the SMS Service Center 340. Once the SMS Service Center 340 receives an acknowledgment that the SMS message 310 has been delivered, the SMS Service Center 340 can then send a message to the originating MS 300 informing the MS 300 of the time and date of delivery of the SMS message 310. If, however, the SMS message 310 was not sent to the desired end party 350, a message can be sent to the originating MS 300 informing the MS 300 that the SMS message 310 could not be delivered.

Figure 4:
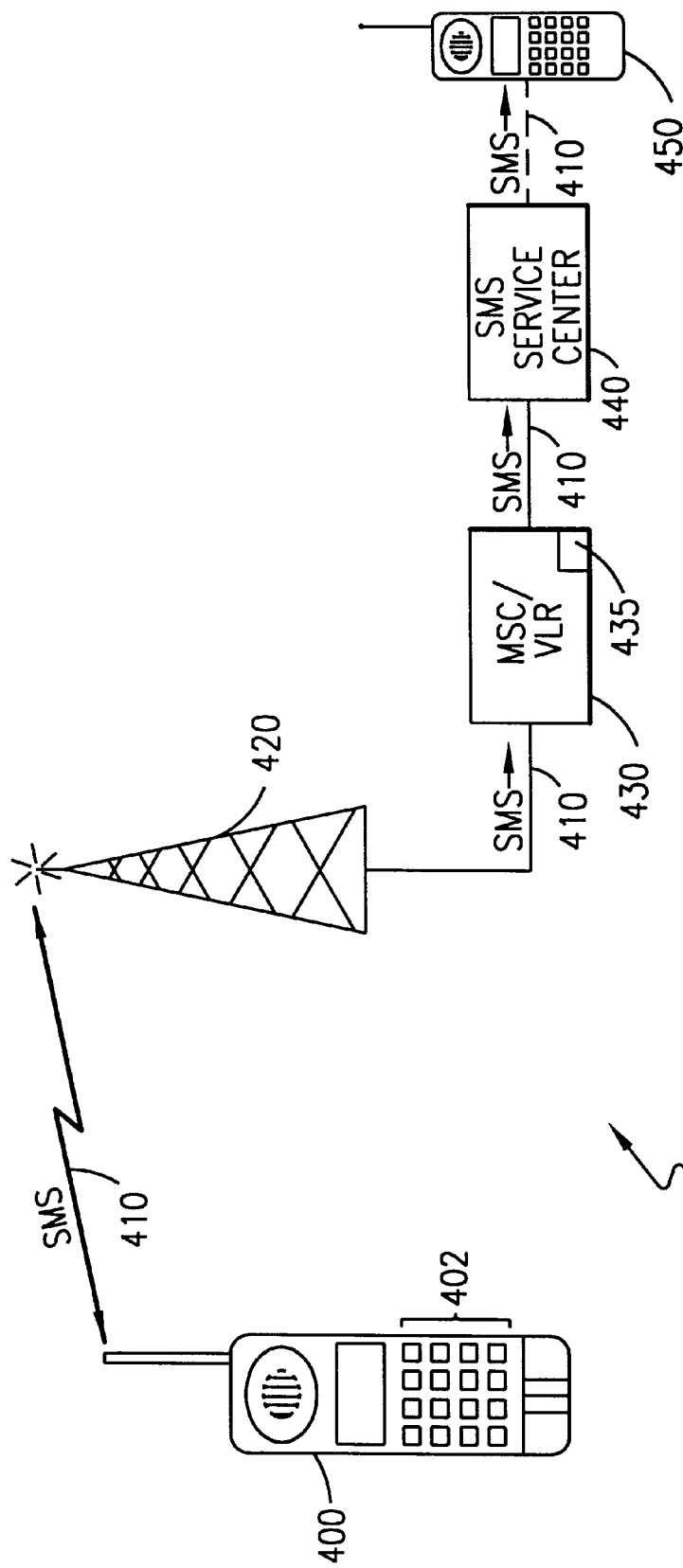
FIG. 4 depicts the storage of an SMS message within a Mobile Switching Center serving the area that the mobile terminal is in until the requested time and date of delivery is reached.

In an alternative embodiment, as indicated in FIG. 4 of the drawings, the time and date information, which can be entered on the keypad 402 of the MS 400 as discussed hereinbefore, along with the SMS message 410, can be sent to and stored in the MSC/VLR 430 serving the location area (LA) 405 that the MS 400 is in. The SMS message 410 and the time and date information can be sent to the serving MSC/VLR 430 via the serving BTS 420 using either an SMS message format or an Unstructured Supplementary Service Data (USSD) message format. Once the MSC/VLR 430 receives the SMS message 410 and the time and date information, the SMS message 410 is stored in a memory 435 within the MSC/VLR 430 until the time and date specified is reached. The MSC/VLR 430 monitors the system time and date information and when the requested time and date of delivery matches the system time and date, the MSC/VLR 430 forwards the SMS message 410 to the SMS Service Center 440 for delivery to the end party, e.g., another MS 450.

Figure 5:
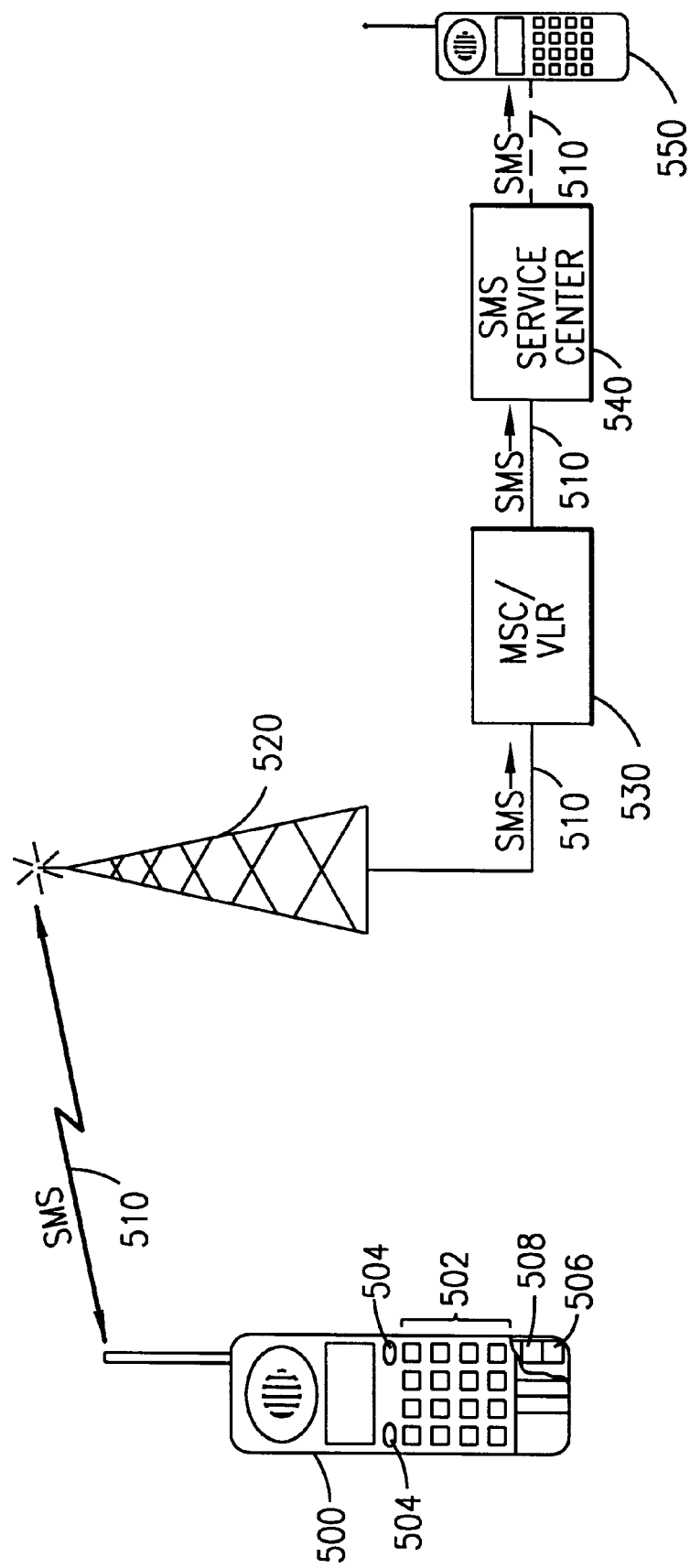
FIG. 5 illustrates the storage of an SMS message within the mobile terminal itself until the requested time and date of delivery is reached.

In a further alternative embodiment, as shown in FIG. 5 of the drawings, the time and date information and the SMS message 510 are entered on the keypad 502 of the MS 500 using function keys 504, instead of a service code, and stored in a memory 506, e.g., a Subscriber Identity Module (SIM) card, within the MS 500 itself. The MS 500 periodically checks the broadcasted system date and time and when the requested date and time information matches the system date and time, a USSD or SMS application 508 within the MS 500 generates the SMS message 510 and sends it to the serving MSC/VLR 530 via the serving BTS 520, which then forwards the SMS message 510 to the SMS Service Center 540 for final delivery to the end party 550. It should be understood that the end party 550 can be the originating MS 500. For example, the originating MS 500 may desire to have a reminder SMS message 510 sent to the MS 500 at a certain date and time.

However, it should be understood that the MS 500 must be in communication with the serving MSC/VLR 530, e.g., the MS 500 must be "ON", in order for the MS 500 to receive the broadcasted system time and date information and to send the SMS message 510. If the mobile is subscriber turns the MS 500 "OFF", then the SMS message 510 will not be sent until the MS 500 is turned "ON" again and the MS 500 determines that the requested time and date of delivery has been reached.

Advantageously, embodiments of the present invention allow mobile subscribers to send messages to themselves at predetermined times. For example, a mobile subscriber could enter a message reminding the mobile subscriber of a meeting or other event prior to its occurrence. In addition, defining the date and time of delivery of SMS messages would enable a supervisor to program the delivery of a SMS message to remind employees of important events, such as a meeting or other function. For example, a mobile subscriber could send a SMS message to their spouse at a predefined time to remind the spouse of dinner arrangements, to ask the spouse to stop by the store on the way home, or to inform the spouse of a change in plans.

As will be recognized by those skilled in the art, the innovative concepts described in the present application can be modified and varied over a wide range of applications. Accordingly, the scope of patented subject matter should not be limited to any of the specific exemplary teachings discussed.

For example, it should be understood that embodiments of the present invention can be applied to any cellular network, including, but not limited to, the Global System for Mobile Communications (GSM) network, the AMPS network, the D-AMPS network, and the Personal Communications System (PCS) network.

What is claimed is:

1. A telecommunications system for delivering a Short Message Service message from a given one a plurality of mobile terminals to an end user, said telecommunications system comprising:

a mobile switching center in wireless communication with said given mobile terminal for receiving a service code, a user-defined date and time and said Short Message Service message from said given mobile terminal, said service code instructing said telecommunications system to send said Short Message Service message to said end user only at said user-defined date and time;

a service node, in communication with said mobile switching center, for receiving said Short Message Service message from said mobile switching center, said service node delivering said Short Message Service message to said end user at said user-defined date and time; and a memory within said telecommunications system for storing said Short Message Service message until said user-defined date and time is reached.

2. The telecommunications system of claim 1, wherein said memory is within said service node.

3. The telecommunications system of claim 2, wherein said service code is entered on a keypad for said given mobile terminal followed by said user-defined date and time and said Short Message Service message, said Short Message Service message and said user-defined date and time being sent to said service node via said mobile switching center, using said service code.

4. The telecommunications system of claim 3, wherein said Short Message Service message and said user-defined date and time are sent to said mobile switching center using an Unstructured Supplementary Service Data message.

5. The telecommunications system of claim 1, wherein said memory is within said mobile switching center.

6. The telecommunications system of claim 5, wherein said service code is entered on a keypad on said given mobile terminal followed by said user-defined date and time and said Short Message Service message, said mobile switching center forwarding said Short Message Service message to said service node when said user-defined date and time is reached.

7. The telecommunications system of claim 1, wherein said end user is an additional mobile terminal.

8. A method for delivering a Short Message Service message from a given one of a plurality of mobile terminals to an end user, said method comprising the steps of:

entering, on said given mobile terminal, a service code and a user-defined date and time for delivery of Short Message Service message to said end user, said service code instructing said telecommunications system to send said Short Message Service Message to said end user only at said user-defined date and time;

sending, by said given mobile terminal, said service code, said user-defined date and time and said Short Message Service message to a mobile switching center in wireless communication with said given mobile terminal;

forwarding, by said mobile switching center, said Short Message Service message to a service node connected to said mobile switching center; and delivering, by said service node, said Short Message Service message to said end user at said user-defined date and time.

9. The method of claim 8, further comprising, before said step of delivering, the step of:

storing said Short Message Service message within a memory within said service node.

10. The method of claim 9, wherein said step of forwarding further comprises the step of:

forwarding said Short Message Service message and said user-defined date and time from said mobile switching center to said service node, using said service code.

11. The method of claim 10, wherein said Short Message Service message and said user-defined date and time are sent to said mobile switching center using an Unstructured Supplementary Service Data message.

12. The method of claim 8, further comprising, before said step of forwarding, the step of:

storing said Short Message Service message within a memory within said mobile switching center.

13. The method of claim 8, wherein said end user is an additional mobile terminal.

* * * * *

UNITED STATES PATENT AND TRADEMARK OFFICE
CERTIFICATE OF CORRECTION

PATENT NO : 6,044,275
DATED : March 28, 200
INVENTOR(S): Boltz et al.

It is certified that error appears in the above-identified patent and that said Letters Patent are hereby corrected as shown below:

Column 5, line 17      Replace "mobile is"
                       With --mobile--

Signed and Sealed this

Twenty-fourth Day of April, 2001

Attest:

NICHOLAS P. GODICI

Attesting Officer      Acting Director of the United States Patent and Trademark Office